US010897767B2

(12) United States Patent
Zhang et al.

(10) Patent No.: US 10,897,767 B2
(45) Date of Patent: *Jan. 19, 2021

(54) RESOURCE SCHEDULING METHOD, APPARATUS, AND SYSTEM

(71) Applicant: Huawei Technologies Co., Ltd., Shenzhen (CN)

(72) Inventors: Xingwei Zhang, Beijing (CN); Chao Li, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/560,634

(22) Filed: Sep. 4, 2019

(65) Prior Publication Data

US 2019/0394766 A1    Dec. 26, 2019

Related U.S. Application Data

(63) Continuation of application No. 15/346,510, filed on Nov. 8, 2016, now Pat. No. 10,433,314, which is a
(Continued)

(51) Int. Cl.
*H04W 72/04* (2009.01)
*H04W 72/12* (2009.01)

(52) U.S. Cl.
CPC ....... *H04W 72/048* (2013.01); *H04W 72/042* (2013.01); *H04W 72/0413* (2013.01);
(Continued)

(58) Field of Classification Search
None
See application file for complete search history.

(56) References Cited

U.S. PATENT DOCUMENTS

2013/0124937 A1    5/2013  Kim et al.
2013/0155962 A1    6/2013  Hakola et al.
(Continued)

FOREIGN PATENT DOCUMENTS

CN    102131299 A    7/2011
CN    102291785 A    12/2011
(Continued)

OTHER PUBLICATIONS

"On Scheduling Assignments and Receiver Behaviour," 3GPP TSG-RAN WG1 Meeting #76bis, Shenzhen, China, R1-141391, 3rd Generation Partnership Project, Valbonne, France (Mar. 31-Apr. 4, 2014).
(Continued)

*Primary Examiner* — Kouroush Mohebbi
(74) *Attorney, Agent, or Firm* — Leydig, Voit & Mayer, Ltd.

(57) ABSTRACT

Embodiments of the present disclosure provide a resource scheduling method, apparatus, and system. The embodiments of the present disclosure relate to the field of communications technologies and are used to resolve a problem of resource scheduling in Device-to-Device (D2D) communication. The method includes: sending, by a first node, first control signaling to a second node, where the first control signaling includes information about a resource for second control signaling transmission and information about a resource for data transmission; and receiving, by the second node, the first control signaling sent by the first node, and sending second control signaling to a third node by using the resource for the second control signaling transmission, and sending data to the third node by using the resource for the data transmission. The resource scheduling method, apparatus, and system can be applied to a data transmission device requiring relatively high delay performance.

4 Claims, 4 Drawing Sheets

Related U.S. Application Data continuation of application No. PCT/CN2014/077060, filed on May 8, 2014.

(52) U.S. Cl.
CPC .... *H04W 72/1215* (2013.01); *H04W 72/0446* (2013.01); *H04W 72/0453* (2013.01)

(56) References Cited

U.S. PATENT DOCUMENTS

| | | | |
|---|---|---|---|
| 2017/0048829 A1* | 2/2017 | Kim | H04W 72/1289 |
| 2017/0142697 A1 | 5/2017 | Dai et al. | |
| 2017/0164381 A1* | 6/2017 | Kim | H04L 5/0007 |

FOREIGN PATENT DOCUMENTS

| | | |
|---|---|---|
| CN | 102395160 A | 3/2012 |
| CN | 103686753 A | 3/2014 |
| WO | 2013074462 A1 | 5/2013 |

OTHER PUBLICATIONS

"Scheduling-based D2D Communication Resource Allocation," 3GPP TSG-RAN WG1 #76bis, Shenzhen, China, R1-14127, 3rd Generation Partnership Project, Valbonne, France (Mar. 31-Apr. 4, 2014).

"Resource Pool Configuration for D2D Communication," 3GPP TSG-RAN #85bis, Valencia, Spain, R2-141609, 3rd Generation Partnership Project, Valbonne, France (Mar. 31-Apr. 4, 2014).

"3rd Generation Partnership Project; Technical Specification Group Radio Access Network; Evolved Universal Terrestrial Radio Access (E-UTRA); Multiplexing and channel coding (Release 12)," 3GPP TS 36.212, V12.0.0, pp. 1-88, 3rd Generation Partnership Project, Valbonne, France (Dec. 2013).

"3rd Generation Partnership Project; Technical Specification Group Radio Access Network; Evolved Universal Terrestrial Radio Access (E-UTRA); Physical layer procedures (Release 12)," 3GPP TS 36.213, V12.1.0, pp. 1-186, 3rd Generation Partnership Project, Valbonne, France (Mar. 2014).

"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331, V12.1.0, pp. 1-356,3rd Generation Partnership Project, Valbonne, France (Mar. 2014).

"On resource allocation for D2D communication," 3GPP TSG-RAN WG1 Meeting #76bis, Shenzhen, China, R1-141390, 3rd Generation Partnership Project, Valbonne, France (Mar. 31-Apr. 4, 2014).

"Discussion on D2D Operation within Network Coverage (Mode-1)," 3GPP TSG RAN WG1 Meeting #76bis, Shenzhen, China, R1-141164, pp. 1-7, 3rd Generation Partnership Project, Valbonne, France (Mar. 31-Apr. 4, 2014).

* cited by examiner

RESOURCE SCHEDULING METHOD, APPARATUS, AND SYSTEM

CROSS-REFERENCE TO RELATED APPLICATIONS

This application is a continuation of U.S. patent application Ser. No. 15/346,510, filed on Nov. 8, 2016, which is a continuation of International Application No. PCT/CN2014/077060, filed on May 8, 2014. All of the afore-mentioned patent applications are hereby incorporated by reference in their entireties.

TECHNICAL FIELD

Embodiments of the present disclosure relate to the field of communications technologies, and in particular, to a resource scheduling method, apparatus, and system.

BACKGROUND

With development of wireless communications technologies, services (for example, a high-definition video) requiring an ultra high transmission rate emerge, and load on a wireless communications network becomes increasingly heavy. Device-to-Device (D2D) communication refers to direct communication between terminals without a need of forwarding transmitted data by a base station. The D2D communication not only can relieve load on data transmission of a base station, but also can increase a data transmission rate.

Figure 1:
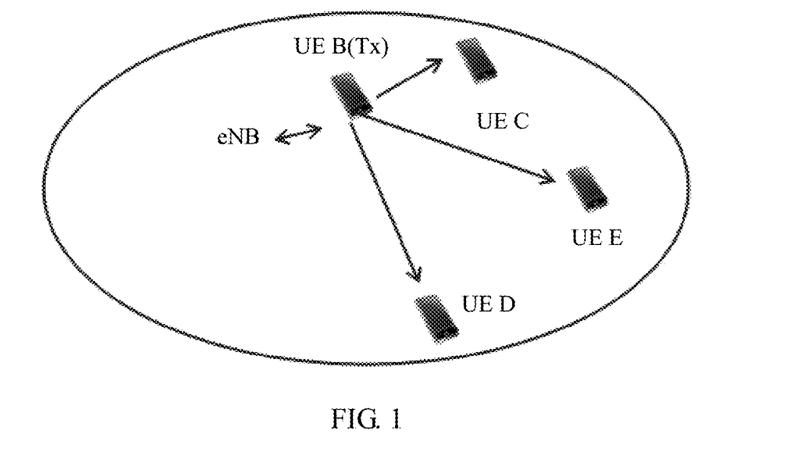
FIG. 1 is a schematic structural diagram of D2D communication.

To increase spectrum utilization and make the most of a radio frequency capability of an existing terminal, in a mobile communications system such as Long Term Evolution (LTE), a D2D communications link generally reuses a spectrum resource of an existing communications network. In general, the D2D communications link reuses a resource in a centralized control manner, in which a transmission resource is allocated by a central control device (for example, a base station). FIG. 1 is a schematic structural diagram of D2D communication. As shown in FIG. 1, a central control device (Evolved Node B (eNB)) allocates a transmission resource to a transmit terminal (UE B(Tx) shown in FIG. 1). The transmit terminal UE B uses the transmission resource allocated by the central control device to send, to a receive terminal (UE C, UE D, and UE E shown in FIG. 1) in a broadcast manner, data and control signaling related to the data such as scheduling assignment (SA) information. In broadcast communication, a broadcast sending party sends a data service on a specific resource, and a receiving party receives data on a corresponding resource. Therefore, the transmit terminal needs to first send the control signaling to the receive terminal, so as to instruct the receive terminal to receive resource information of the data, and then send the data to the receive terminal. The transmission resource allocated by the central control device to the transmit terminal includes an SA transmission resource and a data transmission resource, and the central control device needs to notify the transmit terminal of the transmission resource information in time.

In the prior art, a central control device schedules an SA transmission resource by sending an SA scheduling permission command to a transmit terminal, and schedules a data transmission resource by sending a data scheduling permission command to the transmit terminal. A resource scheduling method in the prior art causes high signaling overheads and low efficiency.

SUMMARY

Embodiments of the present disclosure provide a resource scheduling method, apparatus, and system, so as to reduce signaling overheads of resource scheduling and increase efficiency of resource scheduling.

To achieve the foregoing objective, the following technical solutions are used in the embodiments of the present disclosure:

According to a first aspect, an embodiment of the present disclosure provides a resource scheduling method, including:

receiving, by a second node, first control signaling sent by a first node, where the first control signaling includes information about a resource for second control signaling transmission and information about a resource for data transmission;

sending, by the second node, second control signaling to a third node by using the resource for the second control signaling transmission; and sending, by the second node, data to the third node by using the resource for the data transmission.

In a first possible implementation manner of the first aspect, the first control signaling includes one frequency domain resource field, where the frequency domain resource field is used to identify a frequency domain resource for the second control signaling transmission of the second node and a frequency domain resource for the data transmission of the second node, where the frequency domain resource for the second control signaling transmission is the same as the frequency domain resource for the data transmission.

In a second possible implementation manner of the first aspect, the first control signaling includes one frequency domain resource field, where the frequency domain resource field is used to identify a frequency domain resource for the data transmission of the second node, and a frequency domain resource for the second control signaling transmission of the second node is predefined or semi-statically configured, or is configured by using a system message.

In a third possible implementation manner of the first aspect, the first control signaling includes two frequency domain resource fields, where the two frequency domain resource fields are respectively used to identify a frequency domain resource for the second control signaling transmission of the second node and a frequency domain resource for the data transmission of the second node.

In a fourth possible implementation manner of the first aspect, the first control signaling includes information about transmission resources for multiple times of the second control signaling transmission and multiple times of the data transmission, where information about a time domain resource for the second control signaling transmission includes:

a start time domain resource number of the second control signaling transmission, or a calculation rule of a start time domain resource number of the second control signaling transmission; and/or a quantity of time domain resources occupied for each time of the second control signaling transmission; and/or a cycle of the second control signaling transmission or an interval between two times of the second control signaling transmission; and/or a quantity of times of the second control signaling transmission.

In a fifth possible implementation manner of the first aspect, the first control signaling includes information about transmission resources for multiple times of the second control signaling transmission and multiple times of the data transmission, where information about a time domain resource for the data transmission includes:
  a start time domain resource number of the first time of the data transmission, or a calculation rule of a start time domain resource number of the first time of the data transmission; and/or
  a quantity of time domain resources occupied for each time of the data transmission; and/or
  a cycle of the data transmission or an interval between two times of the data transmission; and/or
  a quantity of times of the data transmission.

In a sixth possible implementation manner of the first aspect, the first control signaling includes information about transmission resources for one time of the second control signaling transmission and multiple times of the data transmission, where information about a time domain resource for the second control signaling transmission includes:
  a start time domain resource number of the second control signaling transmission, or a calculation rule of a start time domain resource number of the second control signaling transmission; and/or
  a quantity of time domain resources occupied for the second control signaling transmission; and
  information about a time domain resource for the data transmission includes:
  a start time domain resource number of the first time of the data transmission, or a calculation rule of a start time domain resource number of the first time of the data transmission; and/or
  a quantity of time domain resources occupied for each time of the data transmission; and/or
  a cycle of the data transmission or an interval between two times of the data transmission; and/or
  a quantity of times of the data transmission.

In a seventh possible implementation manner of the first aspect, the first control signaling includes information about transmission resources for one time of the second control signaling transmission and one time of the data transmission, where a time domain resource for the second control signaling transmission is continuous with a time domain resource for the data transmission, where the first control signaling includes a quantity of time domain resources occupied for the second control signaling transmission, and/or a quantity of time domain resources occupied for the data transmission, and/or a start time domain resource number of the second control signaling transmission; or the first control signaling includes a total quantity of time domain resources occupied for the second control signaling transmission and the data transmission, and/or a quantity of time domain resources occupied for the second control signaling transmission or a proportion of time domain resources occupied for the second control signaling transmission, and/or a start time domain resource number of the second control signaling transmission; or the first control signaling includes a total quantity of time domain resources occupied for the second control signaling transmission and the data transmission, and/or a quantity of time domain resources occupied for the data transmission or a proportion of time domain resources occupied for the data transmission, and/or a start time domain resource number of the second control signaling transmission.

In an eighth possible implementation manner of the first aspect, the first control signaling includes information about transmission resources for one time of the second control signaling transmission and one time of the data transmission, where a time domain resource for the second control signaling transmission is not continuous with a time domain resource for the data transmission, where the first control signaling includes a quantity of time domain resources occupied for the second control signaling transmission, and/or a quantity of time domain resources occupied for the data transmission, and/or a start time domain resource number of the second control signaling transmission, and/or an interval between the data transmission and the second control signaling transmission.

In a ninth possible implementation manner of the first aspect, the first control signaling includes one field, where the field is used to identify, in a bitmap manner, which resource is used for the second control signaling transmission and which resource is used for the data transmission.

In a tenth possible implementation manner of the first aspect, the first control signaling includes one field, where the field is used to identify a serial number of a predefined resource pattern occupied for the second control signaling transmission and a serial number of a predefined resource pattern occupied for the data transmission.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, the ninth possible implementation manner of the first aspect, or the tenth possible implementation manner of the first aspect, in an eleventh possible implementation manner of the first aspect, the first control signaling further includes other parameter information for the second control signaling and other parameter information for the data transmission, where
  the first control signaling includes one public field, where the public field is used to identify both the other parameter information for the second control signaling and the other parameter information for the data transmission; or the first control signaling includes two dedicated fields, where the two dedicated fields are respectively used to identify the other parameter information for the second control signaling and the other parameter information for the data transmission; or the first control signaling includes one field, where the field is used to identify the other parameter information for the data transmission, and other parameters of the second control signaling are fixed, predefined, semi-statically configured, or are configured by using the system message.

According to a second aspect, an embodiment of the present disclosure provides a resource scheduling method, including:
  acquiring, by a first node, information about a resource for second signaling transmission of a second node and information about a resource for data transmission of the second node, where the resource is a frequency domain resource and/or a time domain resource; and
  sending, by the first node, first control signaling to the second node, where the first control signaling includes the information about the resource for the second control signaling transmission and the information about the resource for the data transmission, so that after receiving the first control signaling, the second node may use the resource for the second control signaling transmission to send second control signaling to a third node, and/or use the resource for the data transmission to send data to the third node.

According to a third aspect, an embodiment of the present disclosure provides a resource scheduling apparatus, including:

a receiving module, configured to receive first control signaling sent by a first node, where the first control signaling includes information about a resource for second control signaling transmission and information about a resource for data transmission; and a sending module, configured to send second control signaling to a third node by using the resource for the second control signaling transmission, where the sending module is further configured to send data to the third node by using the resource for the data transmission.

In a first possible implementation manner of the third aspect, the first control signaling includes one frequency domain resource field, where the frequency domain resource field is used to identify a frequency domain resource for the second control signaling transmission of the second node and a frequency domain resource for the data transmission of the second node, where the frequency domain resource for the second control signaling transmission is the same as the frequency domain resource for the data transmission.

In a second possible implementation manner of the third aspect, the first control signaling includes one frequency domain resource field, where the frequency domain resource field is used to identify a frequency domain resource for the data transmission of the second node, and a frequency domain resource for the second control signaling transmission of the second node is predefined or semi-statically configured, or is configured by using a system message.

In a third possible implementation manner of the third aspect, the first control signaling includes two frequency domain resource fields, where the two frequency domain resource fields are respectively used to identify a frequency domain resource for the second control signaling transmission of the second node and a frequency domain resource for the data transmission of the second node.

In a fourth possible implementation manner of the third aspect, the first control signaling includes information about transmission resources for multiple times of the second control signaling transmission and multiple times of the data transmission, where information about a time domain resource for the second control signaling transmission includes:

a start time domain resource number of the second control signaling transmission, or a calculation rule of a start time domain resource number of the second control signaling transmission; and/or a quantity of time domain resources occupied for each time of the second control signaling transmission; and/or a cycle of the second control signaling transmission or an interval between two times of the second control signaling transmission; and/or a quantity of times of the second control signaling transmission.

In a fifth possible implementation manner of the third aspect, the first control signaling includes information about transmission resources for multiple times of the second control signaling transmission and multiple times of the data transmission, where information about a time domain resource for the data transmission includes:

a start time domain resource number of the first time of the data transmission, or a calculation rule of a start time domain resource number of the first time of the data transmission; and/or a quantity of time domain resources occupied for each time of the data transmission; and/or a cycle of the data transmission or an interval between two times of the data transmission; and/or a quantity of times of the data transmission.

In a sixth possible implementation manner of the third aspect, the first control signaling includes information about transmission resources for one time of the second control signaling transmission and multiple times of the data transmission, where information about a time domain resource for the second control signaling transmission includes:

a start time domain resource number of the second control signaling transmission, or a calculation rule of a start time domain resource number of the second control signaling transmission; and/or a quantity of time domain resources occupied for the second control signaling transmission; and information about a time domain resource for the data transmission includes:

a start time domain resource number of the first time of the data transmission, or a calculation rule of a start time domain resource number of the first time of the data transmission; and/or a quantity of time domain resources occupied for each time of the data transmission; and/or a cycle of the data transmission or an interval between two times of the data transmission; and/or a quantity of times of the data transmission.

In a seventh possible implementation manner of the third aspect, the first control signaling includes information about transmission resources for one time of the second control signaling transmission and one time of the data transmission, where a time domain resource for the second control signaling transmission is continuous with a time domain resource for the data transmission, where the first control signaling includes a quantity of time domain resources occupied for the second control signaling transmission, and/or a quantity of time domain resources occupied for the data transmission, and/or a start time domain resource number of the second control signaling transmission; or the first control signaling includes a total quantity of time domain resources occupied for the second control signaling transmission and the data transmission, and/or a quantity of time domain resources occupied for the second control signaling transmission or a proportion of time domain resources occupied for the second control signaling transmission, and/or a start time domain resource number of the second control signaling transmission; or the first control signaling includes a total quantity of time domain resources occupied for the second control signaling transmission and the data transmission, and/or a quantity of time domain resources occupied for the data transmission or a proportion of time domain resources occupied for the data transmission, and/or a start time domain resource number of the second control signaling transmission.

In an eighth possible implementation manner of the third aspect, the first control signaling includes information about transmission resources for one time of the second control signaling transmission and one time of the data transmission, where a time domain resource for the second control signaling transmission is not continuous with a time domain resource for the data transmission, where the first control signaling includes a quantity of time domain resources occupied for the second control signaling transmission, and/or a quantity of time domain resources occupied for the data transmission, and/or a start time domain resource number of the second control signaling transmission, and/or an interval between the data transmission and the second control signaling transmission.

In a ninth possible implementation manner of the third aspect, the first control signaling includes one field, where the field is used to identify, in a bitmap manner, which resource is used for the second control signaling transmission and which resource is used for the data transmission.

In a tenth possible implementation manner of the third aspect, the first control signaling includes one field, where the field is used to identify a serial number of a predefined resource pattern occupied for the second control signaling transmission and a serial number of a predefined resource pattern occupied for the data transmission.

With reference to the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, the sixth possible implementation manner of the third aspect, the seventh possible implementation manner of the third aspect, the eighth possible implementation manner of the third aspect, the ninth possible implementation manner of the third aspect, or the tenth possible implementation manner of the third aspect, in an eleventh possible implementation manner of the third aspect, the first control signaling further includes other parameter information for the second control signaling and other parameter information for the data transmission, where the first control signaling includes one public field, where the public field is used to identify both the other parameter information for the second control signaling and the other parameter information for the data transmission; or the first control signaling includes two dedicated fields, where the two dedicated fields are respectively used to identify the other parameter information for the second control signaling and the other parameter information for the data transmission; or the first control signaling includes one field, where the field is used to identify the other parameter information for the data transmission, and other parameters of the second control signaling are fixed, predefined, semi-statically configured, or are configured by using the system message.

According to a fourth aspect, an embodiment of the present disclosure provides a resource scheduling apparatus, including:

an acquiring module, configured to acquire information about a resource for second signaling transmission of a second node and information about a resource for data transmission of the second node, where the resource is a frequency domain resource and/or a time domain resource; and a sending module, configured to send first control signaling to the second node, where the first control signaling includes the information about the resource for the second control signaling transmission and the information about the resource for the data transmission, so that after receiving the first control signaling, the second node may use the resource for the second control signaling transmission to send second control signaling to a third node, and/or use the resource for the data transmission to send data to the third node.

According to a fifth aspect, an embodiment of the present disclosure provides a resource scheduling system, including a first node, a second node, and a third node, where the first node uses a resource scheduling apparatus that is on a first node side and provided in any embodiment of the present disclosure, and the second node uses a resource scheduling apparatus that is on a second node side and provided in any embodiment of the present disclosure.

In the technical solutions provided in the embodiments of the present disclosure, a first node first acquires information about a resource for second control signaling transmission and information about a resource for data transmission, where both resources are pre-allocated to a second node, and sends the information about the resource for the second control signaling transmission and the information about the resource for data transmission to the second node by sending first control signaling to the second node; after receiving the first control signaling sent by the first node, the second node further uses the resource for the second control signaling transmission to send second control signaling to a third node, and uses the resource for the data transmission to send data to the third node. Because the first control signaling includes both the information about the resource for the second control signaling transmission and the information about the resource for the data transmission, parallel scheduling of the resource for the second control signaling transmission and the resource for the data transmission is implemented, which reduces signaling overheads of resource scheduling and increases efficiency of resource scheduling.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

Figure 2:
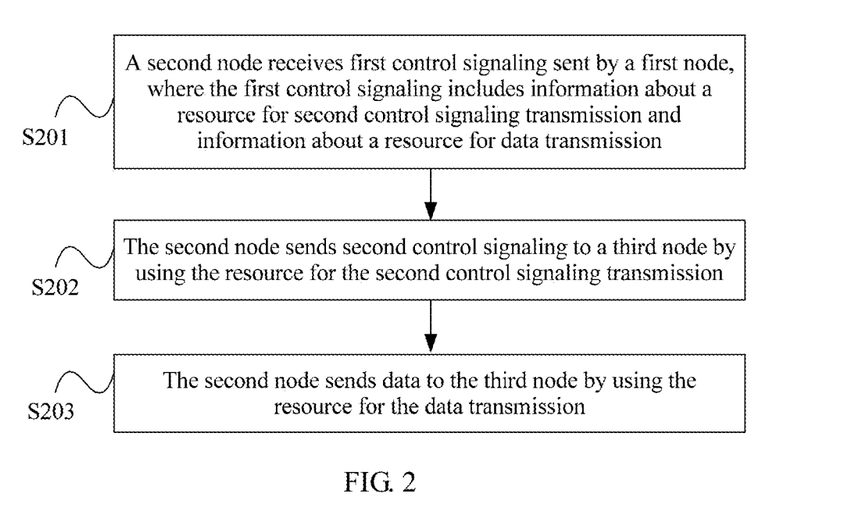
FIG. 2 is a flowchart of Embodiment 1 of a resource scheduling method according to the present disclosure.

FIG. 2 is a flowchart of Embodiment 1 of a resource scheduling method according to the present disclosure. As shown in FIG. 2, the method in this embodiment may include the following content:

S201. A second node receives first control signaling sent by a first node, where the first control signaling includes information about a resource for second control signaling transmission and information about a resource for data transmission.

Specifically, the first node may be a central control device (for example, a base station) in a network, the second node may be a transmitting end device in D2D communication, and the first control signaling may be downlink control information (DCI).

S202. The second node sends second control signaling to a third node by using the resource for the second control signaling transmission.

The third node may be a receiving end device in the D2D communication.

S203. The second node sends data to the third node by using the resource for the data transmission.

Specifically, after receiving the first control signaling that carries the information about the resource for the second control signaling transmission and the information about the resource for the data transmission, where both resources are pre-allocated to the second node, the second node first sends the second control signaling to the third node according to the information about the resource for the second control signaling transmission, and then sends the data to the third node according to the information about the resource for the data transmission.

In this embodiment, a second node receives information about a resource for second control signaling transmission and information about a resource for data transmission, where both resources are pre-allocated to the second node and sent by a first node, and the second node further uses the resource for the second control signaling transmission to send second control signaling to a third node, and uses the resource for the data transmission to send data to the third node. Because the first control signaling includes both the information about the resource for the second control signaling transmission and the information about the resource for the data transmission, parallel scheduling of the resource for the second control signaling transmission and the resource for the data transmission is implemented, which reduces signaling overheads of resource scheduling and increases efficiency of resource scheduling.

In the method described above, the first control signaling includes one frequency domain resource field, where the frequency domain resource field is used to identify a frequency domain resource for the second control signaling transmission of the second node and a frequency domain resource for the data transmission of the second node, where the frequency domain resource for the second control signaling transmission is the same as the frequency domain resource for the data transmission.

For example, if the frequency domain resource pre-allocated to the second node for the second control signaling transmission is the same as the frequency domain resource pre-allocated to the second node for the data transmission, information about the frequency domain resource for the second control signaling transmission of the second node and information about the frequency domain resource for the data transmission of the second node may be recorded in a same field of the DCI, so as to reduce signaling overheads of resource scheduling and increase efficiency of resource scheduling.

In the method described above, the first control signaling includes one frequency domain resource field, where the frequency domain resource field is used to identify a frequency domain resource for the data transmission of the second node, and a frequency domain resource for the second control signaling transmission of the second node is predefined or semi-statically configured, or is configured by using a system message.

Specifically, the frequency domain resource for the second control signaling transmission of the second node may be predefined in a transmission protocol (for example, being six resource blocks (RB) at a central frequency), or may be semi-statically configured (for example, configured by using higher-layer radio resource control (RRC) signaling), or may be configured by using a system message (for example, configured by using a system information block (SIB) message). In this case, the first control signaling may include only one frequency domain resource field that is used to identify the information about the resource for the data transmission of the second node, which therefore can reduce signaling overheads of resource scheduling, and increase efficiency of resource scheduling.

In the method described above, optionally, the first control signaling includes two frequency domain resource fields, where the two frequency domain resource fields are respectively used to identify a frequency domain resource for the second control signaling transmission of the second node and a frequency domain resource for the data transmission of the second node.

For example, information about the frequency domain resource (a quantity of frequency domain resource blocks (RBs) or a quantity of frequency domain resource block groups (RBGs)) for the second control signaling transmission of the second node may be recorded in one field of the DCI, and information about the frequency domain resource (a quantity of frequency domain resource blocks (RBs) or a quantity of frequency domain resource block groups (RBGs)) for the data transmission of the second node may be recorded in another field of the DCI.

Figure 3:
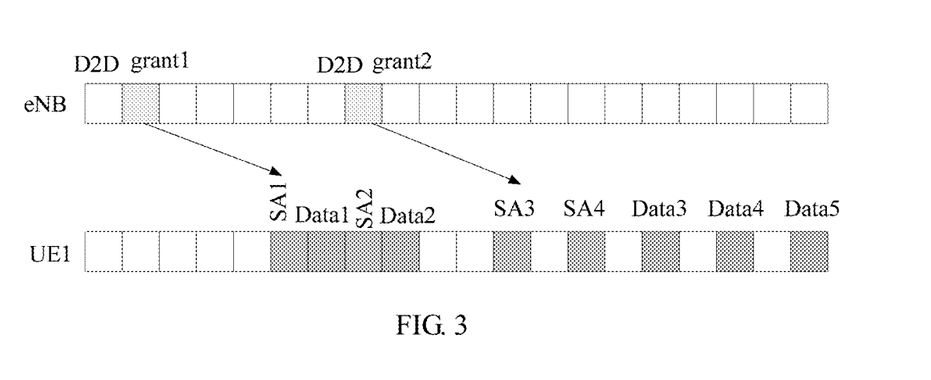
FIG. 3 is a schematic diagram of Embodiment 2 of a resource scheduling method according to the present disclosure.

FIG. 3 is a schematic diagram of Embodiment 2 of a resource scheduling method according to the present disclosure. In this embodiment, a piece of first control signaling includes information about transmission resources for multiple times of SA transmission and multiple times of data transmission. For example, as shown in FIG. 3, a base station eNB sends two control commands to a transmit terminal UE1, where the two control commands are respectively D2D grant1 and D2D grant2. D2D grant1 includes information about transmission resources for two times of SA transmission and two times of data transmission, where the information about the transmission resources for the two times of the SA transmission is respectively SA1 and SA2, and the information about the transmission resources for the two times of the data transmission are respectively Data1 and Data2. D2D grant2 includes information about transmission resources for two times of SA transmission and three times of data transmission, where the information about the transmission resources for the two times of the SA transmission is respectively SA3 and SA4, and the information about the transmission resources for the three times of the data transmission is respectively Data3, Data4, and Data5.

In the method described above, as shown in FIG. 3, the first control signaling includes information about transmission resources for multiple times of second control signaling transmission and multiple times of data transmission, where information about a time domain resource for the second control signaling transmission includes:

a start time domain resource number of the second control signaling transmission, or a calculation rule of a start time domain resource number of the second control signaling transmission; and/or a quantity of time domain resources occupied for each time of the second control signaling transmission; and/or a cycle of the second control signaling transmission or an interval between two times of the second control signaling transmission; and/or a quantity of times of the second control signaling transmission.

Specifically, for example, a control command may provide a start time domain resource number m0 of the second control signaling transmission, or may provide a calculation rule N+m0 of a start time domain resource number of the second control signaling transmission, where m0 may be a fixed value (for example, m0=4), or may be predefined or semi-statically configured, or may be configured by using a system message. Similarly, a quantity m of the time domain resources occupied for each time of the second control signaling transmission may be a fixed value (for example, m=1), or may be predefined or semi-statically configured, or may be configured by using a system message; a cycle p of the second control signaling transmission may be a fixed value (for example, p=8), or may be predefined or semi-statically configured, or may be configured by using a system message; an interval u (u=p−m) between the two times of the second control signaling transmission may be a fixed value (for example, u=5), or may be predefined or semi-statically configured, or may be configured by using a system message; a quantity x of the times of the second control signaling transmission may be a fixed value (for example, x=3), or may be predefined or semi-statically configured, or may be configured by using a system message.

In the method described above, as shown in FIG. 3, the first control signaling includes information about transmission resources for multiple times of second control signaling transmission and multiple times of data transmission, where information about a time domain resource for the data transmission includes:

a start time domain resource number of the first time of the data transmission, or a calculation rule of a start time domain resource number of the first time of the data transmission; and/or a quantity of time domain resources occupied for each time of the data transmission; and/or a cycle of the data transmission or an interval between two times of the data transmission; and/or a quantity of times of the data transmission.

Specifically, for example, a control command may provide a start time domain resource number n0 of the data transmission, or may provide a calculation rule of a start time domain resource number of the data transmission, for example, a set calculation rule of the start time domain resource number of the data transmission is N+n0, where n0 may be a fixed value (for example, n0=5), or may be predefined or semi-statically configured, or may be configured by using a system message; further, an interval s between a start time domain resource for the first time of the data transmission and the first time of the second control signaling transmission may be set, where the start time domain resource number of the data transmission may be obtained by adding s to the last time domain resource number of received second control signaling. Similarly, s may be a fixed value (for example, s=0), or may be predefined or semi-statically configured, or may be configured by using a system message.

Similarly, a quantity n of the time domain resources occupied for each time of the data transmission may be a fixed value (for example, n=3), or may be predefined or semi-statically configured, or may be configured by using a system message; a cycle q of the data transmission may be a fixed value (for example, q=8), or may be predefined or semi-statically configured, or may be configured by using a system message; an interval v (v=q−n) between the two times of the data transmission may be a fixed value (for example, v=5), or may be predefined or semi-statically configured, or may be configured by using a system message; a quantity y of the times of the data transmission may be a fixed value (for example, y=3), or may be predefined or semi-statically configured, or may be configured by using a system message.

Figure 4:
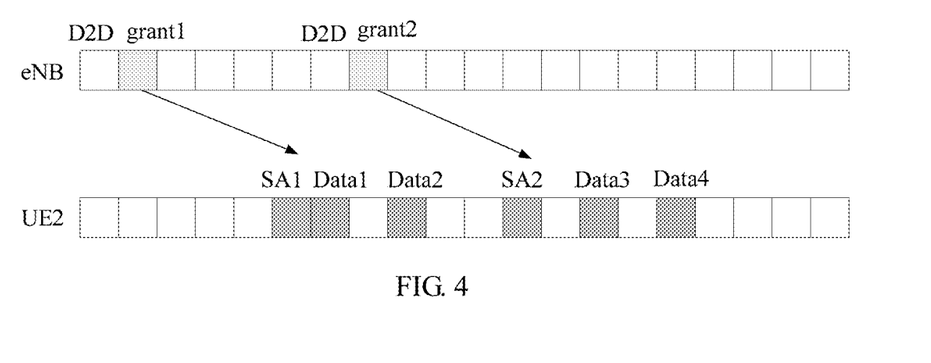
FIG. 4 is a schematic diagram of Embodiment 3 of a resource scheduling method according to the present disclosure.

FIG. 4 is a schematic diagram of Embodiment 3 of a resource scheduling method according to the present disclosure. In this embodiment, a piece of first control signaling includes information about transmission resources for one time of second control signaling transmission and multiple times of data transmission. For example, as shown in FIG. 4, a base station eNB sends two control commands to a transmit terminal UE2, where the two control commands are respectively D2D grant1 and D2D grant2. D2D grant1 includes information about transmission resources for one time of SA transmission and two times of data transmission, where information about a transmission resource for the SA transmission is SA1, and information about transmission resources for the two times of the data transmission is respectively Data1 and Data2. D2D grant2 includes information about transmission resources for one time of SA transmission and two times of data transmission, where information about a transmission resource for the SA transmission is SA2, and information about transmission resources for the two times of the data transmission is respectively Data3 and Data 4.

In the method described above, as shown in FIG. 4, the first control signaling may include information about transmission resources for one time of second control signaling transmission and multiple times of data transmission, where information about a time domain resource for the second control signaling transmission includes:

a start time domain resource number of the second control signaling transmission, or a calculation rule of a start time domain resource number of the second control signaling transmission; and/or a quantity of time domain resources occupied for each time of the second control signaling transmission.

Specifically, for example, a control command may provide a start time domain resource number m0 of the second control signaling transmission, or may provide a calculation rule N+m0 of a start time domain resource number of the second control signaling transmission, where m0 may be a fixed value (for example, m0=4), or may be predefined or semi-statically configured, or may be configured by using a system message. Similarly, a quantity m of the time domain resources occupied for each time of the second control signaling transmission may be a fixed value (for example, m=1), or may be predefined or semi-statically configured, or may be configured by using a system message.

In the method described above, as shown in FIG. 4, the first control signaling includes information about transmission resources for one time of second control signaling transmission and multiple times of data transmission, where information about a time domain resource for the data transmission includes:

a start time domain resource number of the first time of the data transmission, or a calculation rule of a start time domain resource number of the first time of the data transmission; and/or a quantity of time domain resources occupied for each time of the data transmission; and/or a cycle of the data transmission or an interval between two times of the data transmission; and/or a quantity of times of the data transmission.

Specifically, for example, a control command may provide a start time domain resource number n0 of the data transmission, or may provide a calculation rule of a start time domain resource number of the data transmission, for example, a set calculation rule of the start time domain resource number of the data transmission is N+n0, where n0 may be a fixed value (for example, n0=5), or may be predefined or semi-statically configured, or may be configured by using a system message; further, an interval s between a start time domain resource for the first time of the data transmission and the first time of the second control signaling transmission may be set, where the start time domain resource number of the data transmission may be obtained by adding s to the last time domain resource number of received second control signaling. Similarly, s may be a fixed value (for example, s=0), or may be predefined or semi-statically configured, or may be configured by using a system message.

Similarly, a quantity n of the time domain resources occupied for each time of the data transmission may be a fixed value (for example, n=3), or may be predefined or semi-statically configured, or may be configured by using a system message; a cycle q of the data transmission may be a fixed value (for example, q=8), or may be predefined or semi-statically configured, or may be configured by using a system message; an interval v (v=q−n) between the two times of the data transmission may be a fixed value (for example, v=5), or may be predefined or semi-statically configured, or may be configured by using a system message; a quantity y of the times of the data transmission may be a fixed value (for example, y=3), or may be predefined or semi-statically configured, or may be configured by using a system message.

Figure 5:
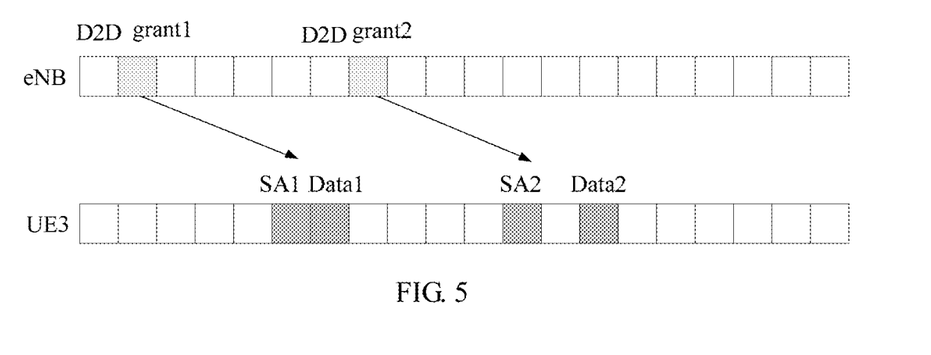
FIG. 5 is a schematic diagram of Embodiment 4 of a resource scheduling method according to the present disclosure.

FIG. 5 is a schematic diagram of Embodiment 4 of a resource scheduling method according to the present disclosure. In this embodiment, a piece of first control signaling includes information about transmission resources for one time of SA transmission and one time of data transmission. For example, as shown in FIG. 5, a base station eNB sends two control commands to a transmit terminal UE3, where the two control commands are respectively D2D grant1 and D2D grant2. D2D grant1 includes information about transmission resources for one time of SA transmission and one time of data transmission, where information about a transmission resource for the SA transmission is SA1, and information about a transmission resource for the data transmission is Data1. D2D grant2 includes information about transmission resources for one time of SA transmission and one time of data transmission, where information about a transmission resource for the SA transmission is SA2, and information about a transmission resource for the data transmission is Data2.

In the method described above, as shown in FIG. 5, the first control signaling includes information about transmission resources for one time of second control signaling transmission and one time of data transmission, where a time domain resource for the second control signaling transmission is continuous with a time domain resource for the data transmission, where the first control signaling includes a quantity of time domain resources occupied for the second control signaling transmission, and/or a quantity of time domain resources occupied for the data transmission, and/or a start time domain resource number of the second control signaling transmission; or the first control signaling includes a total quantity of time domain resources occupied for the second control signaling transmission and the data transmission, and/or a quantity of time domain resources occupied for the second control signaling transmission or a proportion of time domain resources occupied for the second control signaling transmission, and/or a start time domain resource number of the second control signaling transmission; or the first control signaling includes a total quantity of time domain resources occupied for the second control signaling transmission and the data transmission, and/or a quantity of time domain resources occupied for the data transmission or a proportion of time domain resources occupied for the data transmission, and/or a start time domain resource number of the second control signaling transmission.

Specifically, if the time domain resource for the second control signaling transmission is continuous with the time domain resource for the data transmission, the quantity of the time domain resources occupied for the second control signaling transmission may be included in one field of a control command (for example, DCI), and the quantity of the time domain resources occupied for the data transmission may be included in another field of the control command; or the total quantity of the time domain resources occupied for the second control signaling transmission and the data transmission may be included in one field of the control command, and the quantity or the proportion of the time domain resources occupied for the second control signaling transmission may be included in another field of the control command. If the quantity or the proportion of the time domain resources occupied for the second control signaling transmission is a fixed value or semi-statically configured, or is configured by using a system message, only the quantity of the time domain resources occupied for the data transmission may be included in one field of the control command. Further, if the quantity or the proportion of the time domain resources occupied for the second control signaling transmission is a fixed value or semi-statically configured, or is configured by using a system message, only the total quantity of the time domain resources occupied for the second control signaling transmission and the data transmission may be included in one field of the control command.

In the method described above, as shown in FIG. 5, the first control signaling includes information about transmission resources for one time of second control signaling transmission and one time of data transmission, where a time domain resource for the second control signaling transmission is not continuous with a time domain resource for the data transmission, where the first control signaling includes a quantity of time domain resources occupied for the second control signaling transmission, and/or a quantity of time domain resources occupied for the data transmission, and/or a start time domain resource number of the second control signaling transmission, and/or an interval between the data transmission and the second control signaling transmission.

Specifically, if the time domain resource for the second control signaling transmission is not continuous with the time domain resource for the data transmission, the quantity of the time domain resources occupied for the second control signaling transmission may be included in one field of the control command (for example, DCI), the quantity of the time domain resources occupied for the data transmission may be included in another field of the control command, and the interval between the second control signaling transmission and the data transmission may be included in still another field of the control command. The quantity of the time domain resources occupied for the second control signaling transmission, the quantity of the time domain resources occupied for the data transmission, and the interval between the second control signaling transmission and the data transmission may further be included in two fields or a same field of the control command. For example, assuming that the quantity of the time domain resources occupied for the second control signaling transmission is m, the quantity of the time domain resources occupied for the data transmission is n, and the interval between the second control signaling transmission and the data transmission is s, where m, n, and s are fixed values, or predefined, or semi-statically configured, or are configured by using a system message, only one or two fields are required to include the foregoing parameter information.

In the method described above, the first control signaling includes one field, where the field is used to identify, in a bitmap manner, which resource is used for the second control signaling transmission and which resource is used for the data transmission.

In the method described above, the first control signaling includes one field, where the field is used to identify a serial number of a predefined resource pattern occupied for the second control signaling transmission and a serial number of a predefined resource pattern occupied for the data transmission.

In the method described above, the first control signaling further includes other parameter information for second control signaling and other parameter information for the data transmission, where
  the first control signaling includes one public field, where the public field is used to identify both the other parameter information for the second control signaling and the other parameter information for the data transmission; or the first control signaling includes two dedicated fields, where the two dedicated fields are respectively used to identify the other parameter information for the second control signaling and the other parameter information for the data transmission; or the first control signaling includes one field, where the field is used to identify the other parameter information for the data transmission, and other parameters of the second control signaling are fixed, predefined, semi-statically configured, or are configured by using the system message.

Specifically, for example, if other parameters of the second control signaling are the same as other parameters of the data transmission, the other parameter information that is of the second control signaling and the data transmission is included in a same field of the control command (for example, DCI); if other parameters of the second control signaling are different from other parameters of the data transmission, only the other parameter information for the data transmission may be included in one field of the control command, where the other parameters of the second control signaling are fixed, predefined, semi-statically configured, or are configured by using a system message.

Figure 6:
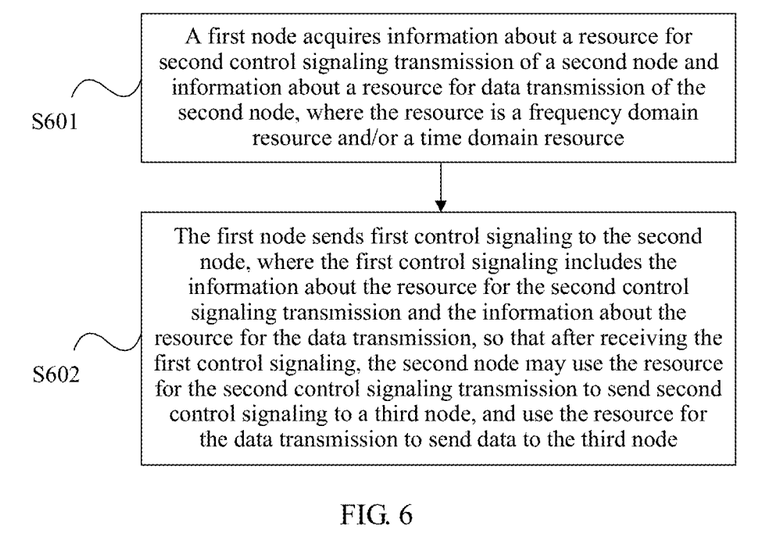
FIG. 6 is a flowchart of Embodiment 5 of a resource scheduling method according to the present disclosure.

FIG. 6 is a flowchart of Embodiment 5 of a resource scheduling method according to the present disclosure. As shown in FIG. 6, the method in this embodiment may include the following content:

S601. A first node acquires information about a resource for second control signaling transmission of a second node and information about a resource for data transmission of the second node, where the resource is a frequency domain resource and/or a time domain resource.

Specifically, the first node may be a central control device (for example, a base station) in a network, and the second node may be a transmitting end device in D2D communication; the resource for the second control signaling transmission of the second node and the resource for the data transmission of the second node are pre-allocated. In this embodiment, the first node only needs to acquire (for example, acquire from a memory) the information about the resource for the second control signaling transmission of the second node and the information about the resource for the data transmission of the second node.

S602. The first node sends first control signaling to the second node, where the first control signaling includes the information about the resource for the second control signaling transmission and the information about the resource for the data transmission, so that after receiving the first control signaling, the second node may use the resource for the second control signaling transmission to send second control signaling to a third node, and use the resource for the data transmission to send data to the third node.

Specifically, the first control signaling may be downlink control information (DCI), and the third node may be a receiving end device in the D2D communication. The first node notifies the second node of the information about the resource allocated to the second node for the second control signaling transmission and the information about the resource allocated to the second node for the data transmission, so that the second node may use the resource pre-allocated to the second node for the second control signaling transmission to send the second control signaling to the third node, and use the resource pre-allocated to the second node for the data transmission to send the data to the third node.

In this embodiment, a first node acquires information about a resource for second control signaling transmission and information about a resource for data transmission, where both resources are pre-allocated to a second node, and sends the information about the resource for the second control signaling transmission and the information about the resource for the data transmission to the second node by sending first control signaling to the second node, so that after receiving the first control signaling, the second node may use the resource for the second control signaling transmission to send second control signaling to a third node, and use the resource for the data transmission to send data to the third node. Because the first control signaling includes both the information about the resource for the second control signaling transmission and the information about the resource for the data transmission, parallel scheduling of the resource for the second control signaling transmission and the resource for the data transmission is implemented, which reduces signaling overheads of resource scheduling and increases efficiency of resource scheduling.

Figure 7:
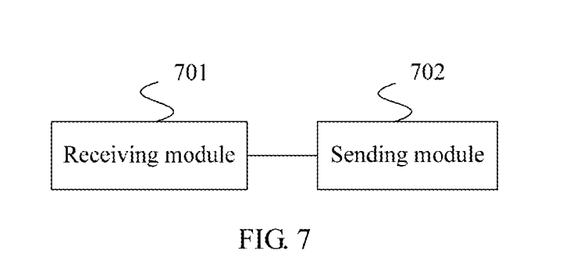
FIG. 7 is a schematic structural diagram of Embodiment 1 of a resource scheduling apparatus according to the present disclosure.

FIG. 7 is a schematic structural diagram of Embodiment 1 of a resource scheduling apparatus according to the present disclosure. As shown in FIG. 7, the resource scheduling apparatus in this embodiment may include: a receiving module 701 and a sending module 702. The receiving module 701 is configured to receive first control signaling sent by a first node, where the first control signaling includes information about a resource for second control signaling transmission and information about a resource for data transmission; the sending module 702 is configured to send second control signaling to a third node by using the resource for the second control signaling transmission; the sending module 701 is further configured to send data to the third node by using the resource for the data transmission.

The resource scheduling apparatus in this embodiment may be configured to execute the method of the method embodiment shown in FIG. 2, and has a corresponding functional module. Implementation principles and desired technical effects thereof are similar, and are not described herein.

According to the apparatus described above, the first control signaling includes one frequency domain resource field, where the frequency domain resource field is used to identify a frequency domain resource for the second control signaling transmission of the second node and a frequency domain resource for the data transmission of the second node, where the frequency domain resource for the second control signaling transmission is the same as the frequency domain resource for the data transmission.

For the resource scheduling apparatus in this embodiment, an implementation principle and a desired effect thereof are already described above, and are not described herein.

According to the apparatus described above, the first control signaling includes one frequency domain resource field, where the frequency domain resource field is used to identify a frequency domain resource for the data transmission of the second node, and a frequency domain resource for the second control signaling transmission of the second node is predefined or semi-statically configured, or is configured by using a system message.

For the resource scheduling apparatus in this embodiment, an implementation principle and a desired effect thereof are already described above, and are not described herein.

According to the apparatus described above, the first control signaling includes two frequency domain resource fields, where the two frequency domain resource fields are respectively used to identify a frequency domain resource for the second control signaling transmission of the second node and a frequency domain resource for the data transmission of the second node.

For the resource scheduling apparatus in this embodiment, an implementation principle and a desired effect thereof are already described above, and are not described herein.

According to the apparatus described above, the first control signaling includes information about transmission resources for multiple times of the second control signaling transmission and multiple times of the data transmission, where information about a time domain resource for the second control signaling transmission includes:
    a start time domain resource number of the second control signaling transmission, or a calculation rule of a start time domain resource number of the second control signaling transmission; and/or
    a quantity of time domain resources occupied for each time of the second control signaling transmission; and/or
    a cycle of the second control signaling transmission or an interval between two times of the second control signaling transmission; and/or
    a quantity of times of the second control signaling transmission.

For the resource scheduling apparatus in this embodiment, an implementation principle and a desired effect thereof are already described above, and are not described herein.

According to the apparatus described above, the first control signaling includes information about transmission resources for multiple times of the second control signaling transmission and multiple times of the data transmission, where information about a time domain resource for the data transmission includes:
    a start time domain resource number of the first time of the data transmission, or a calculation rule of a start time domain resource number of the first time of the data transmission; and/or
    a quantity of time domain resources occupied for each time of the data transmission; and/or
    a cycle of the data transmission or an interval between two times of the data transmission; and/or
    a quantity of times of the data transmission.

For the resource scheduling apparatus in this embodiment, an implementation principle and a desired effect thereof are already described above, and are not described herein.

According to the apparatus described above, the first control signaling includes information about transmission resources for one time of the second control signaling transmission and multiple times of the data transmission, where information about a time domain resource for the second control signaling transmission includes:
    a start time domain resource number of the second control signaling transmission, or a calculation rule of a start time domain resource number of the second control signaling transmission; and/or
    a quantity of time domain resources occupied for the second control signaling transmission; and
    information about a time domain resource for the data transmission includes:
    a start time domain resource number of the first time of the data transmission, or a calculation rule of a start time domain resource number of the first time of the data transmission; and/or
    a quantity of time domain resources occupied for each time of the data transmission; and/or
    a cycle of the data transmission or an interval between two times of the data transmission; and/or
    a quantity of times of the data transmission.

For the resource scheduling apparatus in this embodiment, an implementation principle and a desired effect thereof are already described above, and are not described herein.

According to the apparatus described above, the first control signaling includes information about transmission resources for one time of the second control signaling transmission and one time of the data transmission, where a time domain resource for the second control signaling transmission is continuous with a time domain resource for the data transmission, where the first control signaling includes a quantity of time domain resources occupied for the second control signaling transmission, and/or a quantity of time domain resources occupied for the data transmission, and/or a start time domain resource number of the second control signaling transmission; or the first control signaling includes a total quantity of time domain resources occupied for the second control signaling transmission and the data transmission, and/or a quantity of time domain resources occupied for the second control signaling transmission or a proportion of time domain resources occupied for the second control signaling transmission, and/or a start time domain resource number of the second control signaling transmission; or the first control signaling includes a total quantity of time domain resources occupied for the second control signaling transmission and the data transmission, and/or a quantity of time domain resources occupied for the data transmission or a proportion of time domain resources occupied for the data transmission, and/or a start time domain resource number of the second control signaling transmission.

For the resource scheduling apparatus in this embodiment, an implementation principle and a desired effect thereof are already described above, and are not described herein.

According to the apparatus described above, the first control signaling includes information about transmission resources for one time of the second control signaling transmission and one time of the data transmission, where a time domain resource for the second control signaling transmission is not continuous with a time domain resource for the data transmission, where the first control signaling includes a quantity of time domain resources occupied for the second control signaling transmission, and/or a quantity of time domain resources occupied for the data transmission, and/or a start time domain resource number of the second control signaling transmission, and/or an interval between the data transmission and the second control signaling transmission.

For the resource scheduling apparatus in this embodiment, an implementation principle and a desired effect thereof are already described above, and are not described herein.

According to the apparatus described above, the first control signaling includes one field, where the field is used to identify, in a bitmap manner, which resource is used for the second control signaling transmission and which resource is used for the data transmission.

For the resource scheduling apparatus in this embodiment, an implementation principle and a desired effect thereof are already described above, and are not described herein.

According to the apparatus described above, the first control signaling includes one field, where the field is used to identify a serial number of a predefined resource pattern occupied for the second control signaling transmission and a serial number of a predefined resource pattern occupied for the data transmission.

For the resource scheduling apparatus in this embodiment, an implementation principle and a desired effect thereof are already described above, and are not described herein.

According to the apparatus described above, the first control signaling further includes other parameter information for the second control signaling and other parameter information for the data transmission, where
the first control signaling includes one public field, where the public field is used to identify both the other parameter information for the second control signaling and the other parameter information for the data transmission; or the first control signaling includes two dedicated fields, where the two dedicated fields are respectively used to identify the other parameter information for the second control signaling and the other parameter information for the data transmission; or the first control signaling includes one field, where the field is used to identify the other parameter information for the data transmission, and other parameters of the second control signaling are fixed, predefined, semi-statically configured, or are configured by using the system message.

For the resource scheduling apparatus in this embodiment, an implementation principle and a desired effect thereof are already described above, and are not described herein.

Figure 8:
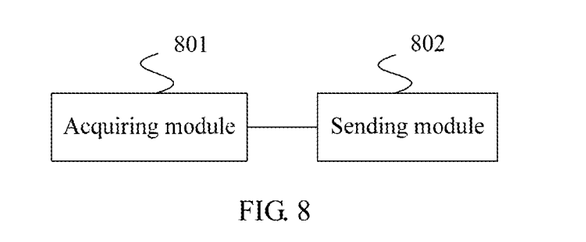
FIG. 8 is a schematic structural diagram of Embodiment 2 of a resource scheduling apparatus according to the present disclosure.

FIG. 8 is a schematic structural diagram of Embodiment 2 of a resource scheduling apparatus according to the present disclosure. As shown in FIG. 8, the resource scheduling apparatus in this embodiment may include: an acquiring module 801 and a sending module 802. The acquiring module 801 is configured to acquire information about a resource for second signaling transmission of a second node and information about a resource for data transmission of the second node, where the resource is a frequency domain resource and/or a time domain resource; and the sending module 802 is configured to send first control signaling to the second node, where the first control signaling includes the information about the resource for the second control signaling transmission and the information about the resource for the data transmission, so that after receiving the first control signaling, the second node may use the resource for the second control signaling transmission to send second control signaling to a third node, and/or use the resource for the data transmission to send data to the third node.

The resource scheduling apparatus in this embodiment may be configured to execute the method of the method embodiment shown in FIG. 6, and has a corresponding function module. Implementation principles and desired technical effects thereof are similar, and are not described herein.

Figure 9:
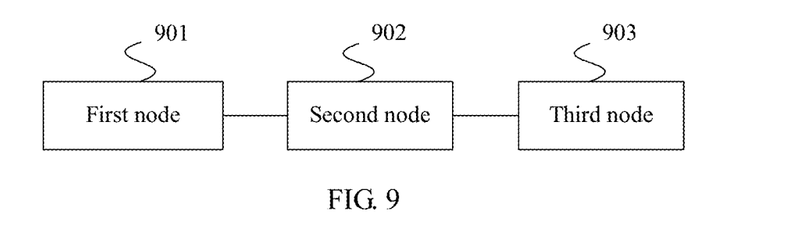
FIG. 9 is a schematic structural diagram of a resource scheduling system according to an embodiment of the present disclosure.

FIG. 9 is a schematic structural diagram of a resource scheduling system according to an embodiment of the present disclosure. As shown in FIG. 9, the resource scheduling system in this embodiment may include a first node 901 (for example, a base station), a second node 902 (for example, a transmitting end device in D2D communication), and a third node 903 (for example, a receiving end device in the D2D communication), where the first node 901 may use a resource scheduling apparatus that is on a first node side and provided in any embodiment of the present disclosure, and the second node 902 may use a resource scheduling apparatus that is on a second node side and provided in any embodiment of the present disclosure. For implementation principles and desired technical effects thereof, reference may be made to the foregoing method embodiments, and details are not described herein.

Figure 10:
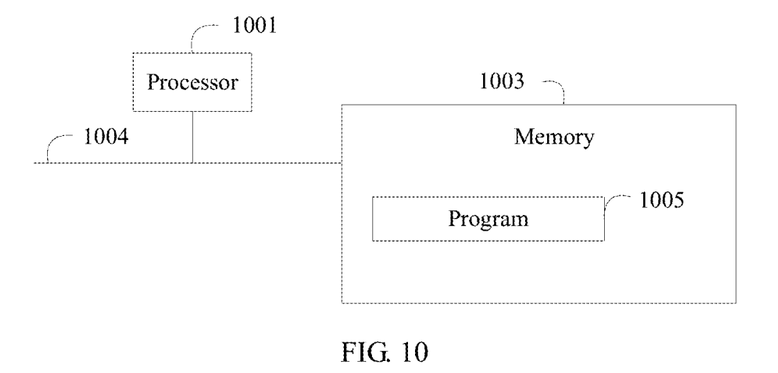
FIG. 10 is a schematic structural diagram of Embodiment 1 of a resource scheduling device according to an embodiment of the present disclosure.

FIG. 10 is a schematic structural diagram of Embodiment 1 of a resource scheduling device according to an embodiment of the present disclosure. As shown in FIG. 10, the resource scheduling device includes at least one processor 1001 (for example, a CPU), a memory 1003, and at least one communications bus 1004 that is configured to implement connection and communication between apparatuses. The processor 1001 is configured to execute an executable module, such as a computer program, stored in the memory 1003. The memory 1003 may include a high-speed random access memory (RAM), and may further include a non-volatile memory, for example, at least one magnetic disk memory.

In some implementation manners, the memory 1003 stores a program 1005, where the program 1005 may be executed by the processor 1001, and the program is used to execute a resource scheduling method, where the method includes:

receiving, by a second node, first control signaling sent by a first node, where the first control signaling includes information about a resource for second control signaling transmission and information about a resource for data transmission;

sending, by the second node, second control signaling to a third node by using the resource for the second control signaling transmission; and sending, by the second node, data to the third node by using the resource for the data transmission.

According to the foregoing program for executing the resource scheduling method, preferably, the first control signaling includes one frequency domain resource field, where the frequency domain resource field is used to identify a frequency domain resource for the second control signaling transmission of the second node and a frequency domain resource for the data transmission of the second node, where the frequency domain resource for the second control signaling transmission is the same as the frequency domain resource for the data transmission.

According to the foregoing program for executing the resource scheduling method, preferably, the first control signaling includes one frequency domain resource field, where the frequency domain resource field is used to identify a frequency domain resource for the data transmission of the second node, and a frequency domain resource for the second control signaling transmission of the second node is predefined or semi-statically configured, or is configured by using a system message.

According to the foregoing program for executing the resource scheduling method, preferably, the first control signaling includes two frequency domain resource fields, where the two frequency domain resource fields are respectively used to identify a frequency domain resource for the second control signaling transmission of the second node and a frequency domain resource for the data transmission of the second node.

According to the foregoing program for executing the resource scheduling method, preferably, the first control signaling includes information about transmission resources for multiple times of the second control signaling transmission and multiple times of the data transmission, where information about a time domain resource for the second control signaling transmission includes:

a start time domain resource number of the second control signaling transmission, or a calculation rule of a start time domain resource number of the second control signaling transmission; and/or a quantity of time domain resources occupied for each time of the second control signaling transmission; and/or a cycle of the second control signaling transmission or an interval between two times of the second control signaling transmission; and/or a quantity of times of the second control signaling transmission.

According to the foregoing program for executing the resource scheduling method, preferably, the first control signaling includes information about transmission resources for multiple times of the second control signaling transmission and multiple times of the data transmission, where information about a time domain resource for the data transmission includes:

a start time domain resource number of the first time of the data transmission, or a calculation rule of a start time domain resource number of the first time of the data transmission; and/or a quantity of time domain resources occupied for each time of the data transmission; and/or a cycle of the data transmission or an interval between two times of the data transmission; and/or a quantity of times of the data transmission.

According to the foregoing program for executing the resource scheduling method, preferably, the first control signaling includes information about transmission resources for one time of the second control signaling transmission and multiple times of the data transmission, where information about a time domain resource for the second control signaling transmission includes:

a start time domain resource number of the second control signaling transmission, or a calculation rule of a start time domain resource number of the second control signaling transmission; and/or a quantity of time domain resources occupied for the second control signaling transmission; and information about a time domain resource for the data transmission includes:

a start time domain resource number of the first time of the data transmission, or a calculation rule of a start time domain resource number of the first time of the data transmission; and/or a quantity of time domain resources occupied for each time of the data transmission; and/or a cycle of the data transmission or an interval between two times of the data transmission; and/or a quantity of times of the data transmission.

According to the foregoing program for executing the resource scheduling method, preferably, the first control signaling includes information about transmission resources for one time of the second control signaling transmission and one time of the data transmission, where a time domain resource for the second control signaling transmission is continuous with a time domain resource for the data transmission, where the first control signaling includes a quantity of time domain resources occupied for the second control signaling transmission, and/or a quantity of time domain resources occupied for the data transmission, and/or a start time domain resource number of the second control signaling transmission; or the first control signaling includes a total quantity of time domain resources occupied for the second control signaling transmission and the data transmission, and/or a quantity of time domain resources occupied for the second control signaling transmission or a proportion of time domain resources occupied for the second control signaling transmission, and/or a start time domain resource number of the second control signaling transmission; or the first control signaling includes a total quantity of time domain resources occupied for the second control signaling transmission and the data transmission, and/or a quantity of time domain resources occupied for the data transmission or a proportion of time domain resources occupied for the data transmission, and/or a start time domain resource number of the second control signaling transmission.

According to the foregoing program for executing the resource scheduling method, preferably, the first control signaling includes information about transmission resources for one time of the second control signaling transmission and one time of the data transmission, where a time domain resource for the second control signaling transmission is not continuous with a time domain resource for the data transmission, where the first control signaling includes a quantity of time domain resources occupied for the second control signaling transmission, and/or a quantity of time domain resources occupied for the data transmission, and/or a start time domain resource number of the second control signaling transmission, and/or an interval between the data transmission and the second control signaling transmission.

According to the foregoing program for executing the resource scheduling method, preferably, the first control signaling includes one field, where the field is used to identify, in a bitmap manner, which resource is used for the second control signaling transmission and which resource is used for the data transmission.

According to the foregoing program for executing the resource scheduling method, preferably, the first control signaling includes one field, where the field is used to identify a serial number of a predefined resource pattern occupied for the second control signaling transmission and a serial number of a predefined resource pattern occupied for the data transmission.

According to the foregoing program for executing the resource scheduling method, preferably, the first control signaling further includes other parameter information for the second control signaling and other parameter information for the data transmission, where the first control signaling includes one public field, where the public field is used to identify both the other parameter information for the second control signaling and the other parameter information for the data transmission; or the first control signaling includes two dedicated fields, where the two dedicated fields are respectively used to identify the other parameter information for the second control signaling and the other parameter information for the data transmission; or the first control signaling includes one field, where the field is used to identify the other parameter information for the data transmission, and other parameters of the second control signaling are fixed, predefined, semi-statically configured, or are configured by using the system message.

Figure 11:
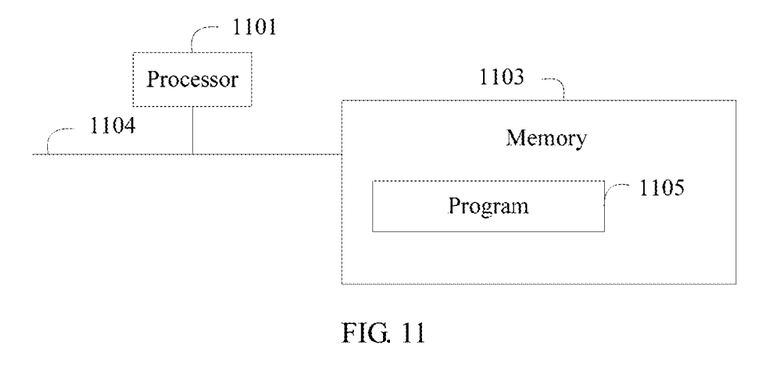
FIG. 11 is a schematic structural diagram of Embodiment 2 of a resource scheduling device according to an embodiment of the present disclosure.

FIG. 11 is a schematic structural diagram of Embodiment 2 of a resource scheduling device according to an embodiment of the present disclosure. As shown in FIG. 11, the resource scheduling device includes at least one processor 1101 (for example, a CPU), a memory 1103, and at least one communications bus 1104 that is configured to implement connection and communication between apparatuses. The processor 1101 is configured to execute an executable module, such as a computer program, stored in the memory 1103. The memory 1103 may include a high-speed random access memory (RAM), and may further include a non-volatile memory, for example, at least one magnetic disk memory.

In some implementation manners, the memory 1103 stores a program 1105, where the program 1105 may be executed by the processor 1101, and the program includes execution of a resource scheduling method, where the method includes:

acquiring, by a first node, information about a resource for second signaling transmission of a second node and information about a resource for data transmission of the second node; where the resource is a frequency domain resource and/or a time domain resource; and sending, by the first node, first control signaling to the second node, where the first control signaling includes the information about the resource for the second control signaling transmission and the information about the resource for the data transmission, so that after receiving the first control signaling, the second node may use the resource for the second control signaling transmission to send second control signaling to a third node, and/or use the resource for the data transmission to send data to the third node.

In some implementation manners, in specific implementation, the first node may be a terminal that is temporarily selected when there is no network coverage to play a role for managing another terminal, for example, a synchronization source or a group head/cluster head; the second node and the third node may be terminals.

Finally, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A resource scheduling method, comprising:
receiving, by a second node, downlink control information (DCI) from a first node, wherein the DCI comprises a first field that includes information about a frequency domain resource for transmitting second control signaling of the second node and a second field that includes information about a frequency domain resource for transmitting data of the second node;
sending, by the second node, the second control signaling to a third node by using the frequency domain resource for transmitting the second control signaling; and
sending, by the second node, the data of the second node to the third node by using the frequency domain resource for transmitting the data of the second node;
wherein the DCI further comprises information about transmission resources for multiple times of transmitting the second control signaling and multiple times of transmitting the data of the second node; and
wherein the DCI further comprises a third field that includes information about a time domain resource for transmitting the data of the second node, and a fourth field indicating transmission resources for multiple times of transmitting the data of the second node.

2. A resource scheduling method, comprising:
acquiring, by a first node, information about a frequency domain resource for transmitting second control signaling of a second node and information about a frequency domain resource for transmitting data of the second node; and sending, by the first node, downlink control information (DCI) to the second node, wherein the DCI comprises a first field that includes the information about the frequency domain resource for transmitting the second control signaling and a second field that includes the frequency domain information about the frequency domain resource for transmitting the data of the second node;

wherein the DCI further comprises information about transmission resources for multiple times of transmitting the second control signaling and multiple times of transmitting the data of the second node; and wherein the DCI further comprises a third field that includes information about a time domain resource for transmitting the data of the second node, and a fourth field indicating transmission resources for multiple times of transmitting the data of the second node.

3. A resource scheduling apparatus, comprising:

a processor; and a memory, wherein the processor is configured to execute a computer program that is stored in the memory to execute a resource scheduling method, wherein the method includes:

receiving downlink control information (DCI) from a first node, wherein the DCI comprises a first field that includes information about a frequency domain resource for transmitting second control signaling of a second node and a second field that includes information about a frequency domain resource for transmitting data of the second node;

sending the second control signaling to a third node by using the frequency domain resource for transmitting the second control signaling; and sending the data of the second node to the third node by using the frequency domain resource for transmitting the data of the second node;

wherein the DCI further comprises information about transmission resources for multiple times of transmitting the second control signaling and multiple times of transmitting the data of the second node; and wherein the DCI further comprises a third field that includes information about a time domain resource for transmitting the data of the second node, and a fourth field indicating transmission resources for multiple times of transmitting the data of the second node.

4. A resource scheduling apparatus, comprising:

a processor; and a memory, wherein the processor is configured to execute a computer program that is stored in the memory to execute a resource scheduling method, wherein the method includes:

acquiring information about a frequency domain resource for transmitting second control signaling of a second node and information about a frequency domain resource for transmitting data of the second node; and sending downlink control information (DCI) to the second node, wherein the DCI comprises a first field that includes the information about the frequency domain resource for transmitting the second control signaling and a second field that includes the frequency domain information about the frequency domain resource for transmitting the data of the second node;

wherein the DCI further comprises information about transmission resources for multiple times of transmitting the second control signaling and multiple times of transmitting the data of the second node; and wherein the DCI further comprises a third field that includes information about a time domain resource for transmitting the data of the second node, and a fourth field indicating transmission resources for multiple times of transmitting the data of the second node.

\* \* \* \* \*